(12) United States Patent
Yang et al.

(10) Patent No.: US 11,625,034 B2
(45) Date of Patent: Apr. 11, 2023

(54) ONE-HANDED REMOTE-CONTROL DEVICE FOR AERIAL SYSTEM

(71) Applicant: Hangzhou Zero Zero Technology Co., Ltd., Zhejiang (CN)

(72) Inventors: Fan Yang, Zhejiang (CN); Shanshan Bu, Zhejiang (CN); Guofan Wu, Zhejiang (CN); Jin Li, Zhejiang (CN); Jiaxin Ma, Zhejiang (CN); Jianye Liu, Zhejiang (CN); Yuanfu Chen, Zhejiang (CN); Tong Zhang, Zhejiang (CN)

(73) Assignee: Hangzhou Zero Zero Technology Co., Ltd

( * ) Notice: Subject to any disclaimer, the term of this patent is extended or adjusted under 35 U.S.C. 154(b) by 398 days.

(21) Appl. No.: 16/718,622

(22) Filed: Dec. 18, 2019

(65) Prior Publication Data

US 2020/0272144 A1   Aug. 27, 2020

Related U.S. Application Data

(60) Provisional application No. 62/808,567, filed on Feb. 21, 2019.

(51) Int. Cl.
| | | |
|---|---|---|
| *G05D 1/00* | (2006.01) | |
| *G05D 1/10* | (2006.01) | |
| *B64C 39/02* | (2006.01) | |
| *B64D 47/08* | (2006.01) | |

(52) U.S. Cl.
CPC ......... *G05D 1/0016* (2013.01); *B64C 39/024* (2013.01); *B64D 47/08* (2013.01); *G05D 1/101* (2013.01); *B64C 2201/027* (2013.01); *B64C 2201/042* (2013.01); *B64C 2201/108* (2013.01); *B64C 2201/127* (2013.01); *B64C 2201/146* (2013.01)

(58) Field of Classification Search
CPC .................. G05D 1/0016; G05D 1/101; B64C 2201/027; B64C 2201/042; B64C 2201/108; B64C 2201/127; B64C 2201/146; G06F 3/017; G06F 1/1694; G06F 1/163
See application file for complete search history.

(56) References Cited

U.S. PATENT DOCUMENTS

2016/0364004 A1* 12/2016 Ekandem ............... G06V 40/28
2018/0173220 A1*  6/2018 Wang .................... G05D 1/0016

* cited by examiner

*Primary Examiner* — Anne Marie Antonucci
*Assistant Examiner* — Jared C Bean
(74) *Attorney, Agent, or Firm* — Endurance Law Group PLC

(57) ABSTRACT

An unmanned aerial system includes a remote controller device and an unmanned aerial vehicle. A user input on the remote controller device indicates a flight command requested by a user. The remote controller device determines a current position and/or orientation of the remote controller device in response to the flight command from the user. The current position and/or orientation is sent to the vehicle. The vehicle responsively determines a desired orientation of the unmanned aerial vehicle as a function of the current position and/or orientation of the remote controller device and operates a lift mechanism to execute a flight operation based on the desired orientation of the unmanned aerial vehicle and the current position of the remote controller device.

22 Claims, 14 Drawing Sheets

ONE-HANDED REMOTE-CONTROL DEVICE FOR AERIAL SYSTEM

RELATED APPLICATION

This application claims the benefit of U.S. Provisional Application Ser. No. 62/808,567, filed on Feb. 21, 2019, which is hereby incorporated by reference in its entirety.

TECHNICAL FIELD

This invention relates generally to unmanned aerial vehicles, and more specifically, to a one-handed remote-control device for aerial systems.

BACKGROUND OF THE INVENTION

Traditional user interface for operating a drone is not user friendly. When a user wants to take a photo or video with a drone equipped with a camera, a dedicated remote controller or a cell phone is used to wirelessly control and maneuver the drone. And it takes a significant amount of effort for the user to position the drone to a desired location and camera view angle before a photo or video can be captured. The battery time is not long for small/medium size drones, typically in the range of 5-20 mins. The longer it takes to position the drone, the less time it leaves for the user to actually use the drone to capture photos and videos. So it is beneficial to have an intuitive, easy-to-use and reliable drone selfie interaction such that the drone can be placed to a desired location as quickly as possible and that most of the flying time of the drone camera can be saved and utilized for its most important functionality: taking photos and videos.

Most of the multirotor drone devices will equip with a two handed remote-controller. Generally, when users control a multirotor drone device, the movable directions of the drone include forwards/backwards; left/right; up/down; horizontal rotation, and drone's gimbal angle. Nowadays most remote-controllers are two-handed required, which is complicated for users to learn and operate.

The present invention is aimed at one or more of the problems identified above.

SUMMARY OF THE INVENTION

In one aspect of the present invention, an aerial system including a remote controller device and an unmanned aerial vehicle is provided. The remote controller device includes a controller device housing, an input device, a controller device sensor unit and an application processor. The input device is coupled to the controller device housing and is configured to receive an input from a user. The controller device sensor unit is located within the controller device housing and configured to sense position and/or orientation of the remote controller device. The application processor is programmed to: (1) receive an input from the user via the input device indicating a flight command requested by the user, (2) determine a current position and/or orientation of the remote controller device as a function of the sensed position and/or orientation of the remote controller device upon receiving the flight command from the user, and (3) send a flight command signal to the unmanned aerial system in response to receiving the input from the user via the user input device. The unmanned aerial vehicle includes an aerial vehicle body, a lift mechanism coupled to aerial vehicle body, vehicle orientation sensors for sensing an orientation of the aerial vehicle body and a processing system operatively coupled to the lift mechanism. The processing system is programmed to execute a program to perform the algorithm steps of: (1) receiving the flight command signal from the remote controller device, (2) receiving the current position and/or orientation of the remote controller device from the remote controller device and responsively determining a desired orientation of the unmanned aerial vehicle as a function of the current position and/or orientation of the remote controller device, and (3) operate the lift mechanism to execute a flight operation based on the desired orientation of the unmanned aerial vehicle and the current position of the remote controller device.

In another aspect of the present invention, a method for operating an aerial system having a remote controller device and an unmanned aerial vehicle is provided. The remote controller device includes a controller device housing, an input device, a controller device sensor unit and an application processor. The input device is coupled to the controller device housing and is configured to receive an input from a user. The controller device sensor unit is located within the controller device housing and is configured to sense position and/or orientation of the remote controller device. The unmanned aerial vehicle includes an aerial vehicle body, a lift mechanism coupled to aerial vehicle body, vehicle orientation sensors for sensing an orientation of the aerial vehicle body; and a processing system operatively coupled to the lift mechanism. The method including the steps of: (1) receiving, by the application processor, an input from the user via the input device indicating a flight command requested by the use, determining, by the application processor, a current position and/or orientation of the remote controller device as a function of the sensed position and/or orientation of the remote controller device upon receiving the flight command from the user, and sending, by the application processor, a flight command signal to the unmanned aerial system in response to receiving the input from the user via the user input device. The method further includes the steps of receiving, by the processing system of the unmanned aerial vehicle, the flight command signal from the remote controller device, receiving, by the processing system of the unmanned aerial vehicle, the current position and/or orientation of the remote controller device from the remote controller device and responsively determining a desired orientation of the unmanned aerial vehicle as a function of the current position and/or orientation of the remote controller device, and operating, by the processing system of the unmanned aerial vehicle, the lift mechanism to execute a flight operation based on the desired orientation of the unmanned aerial vehicle and the current position of the remote controller device.

DETAILED DESCRIPTION OF THE INVENTION

Figure 1:
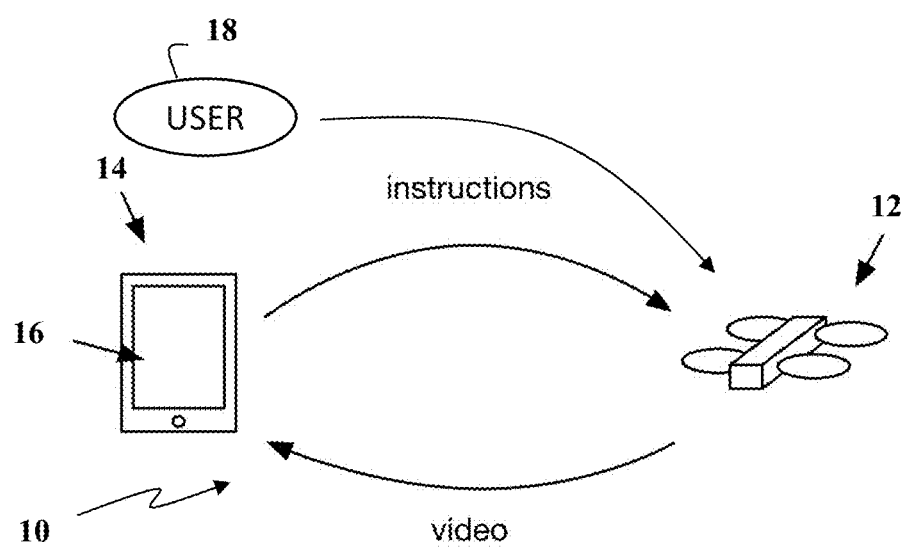
FIG. 1 is a schematic representation of a system for operating an unmanned aerial vehicle, according to an embodiment of the present invention.
Figure 2:
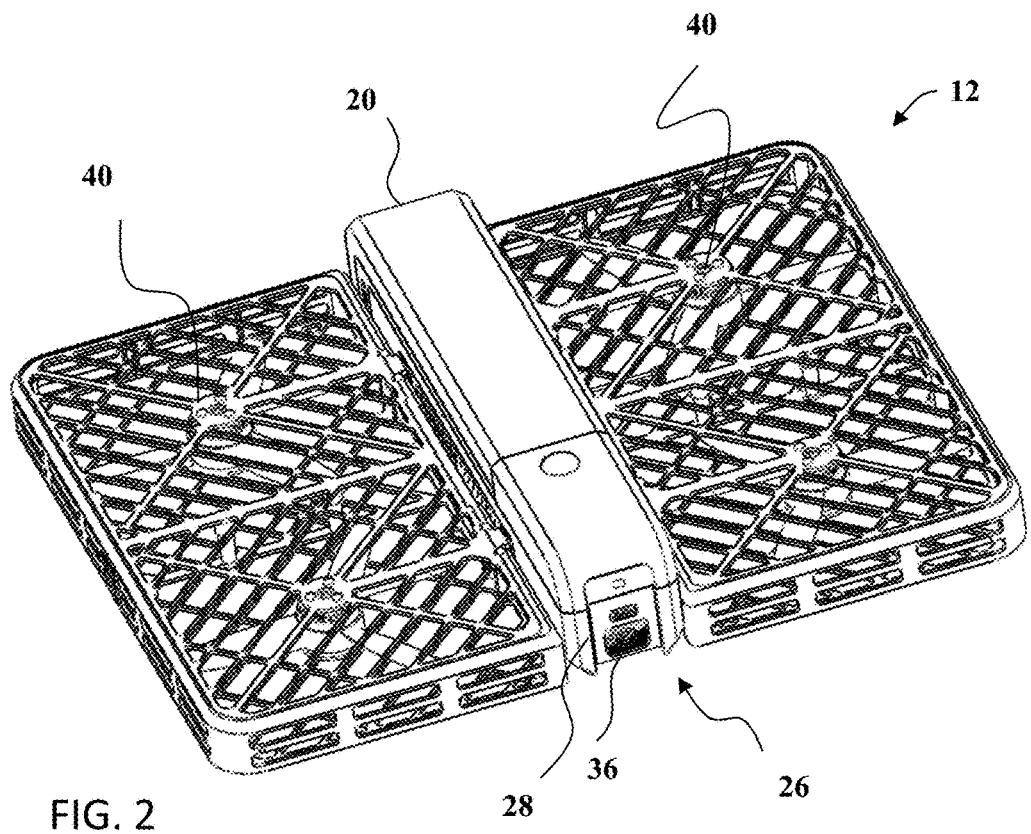
FIGS. 2-3 are perspective views of an unmanned aerial vehicle, according to an embodiment of the present invention.
Figure 3:
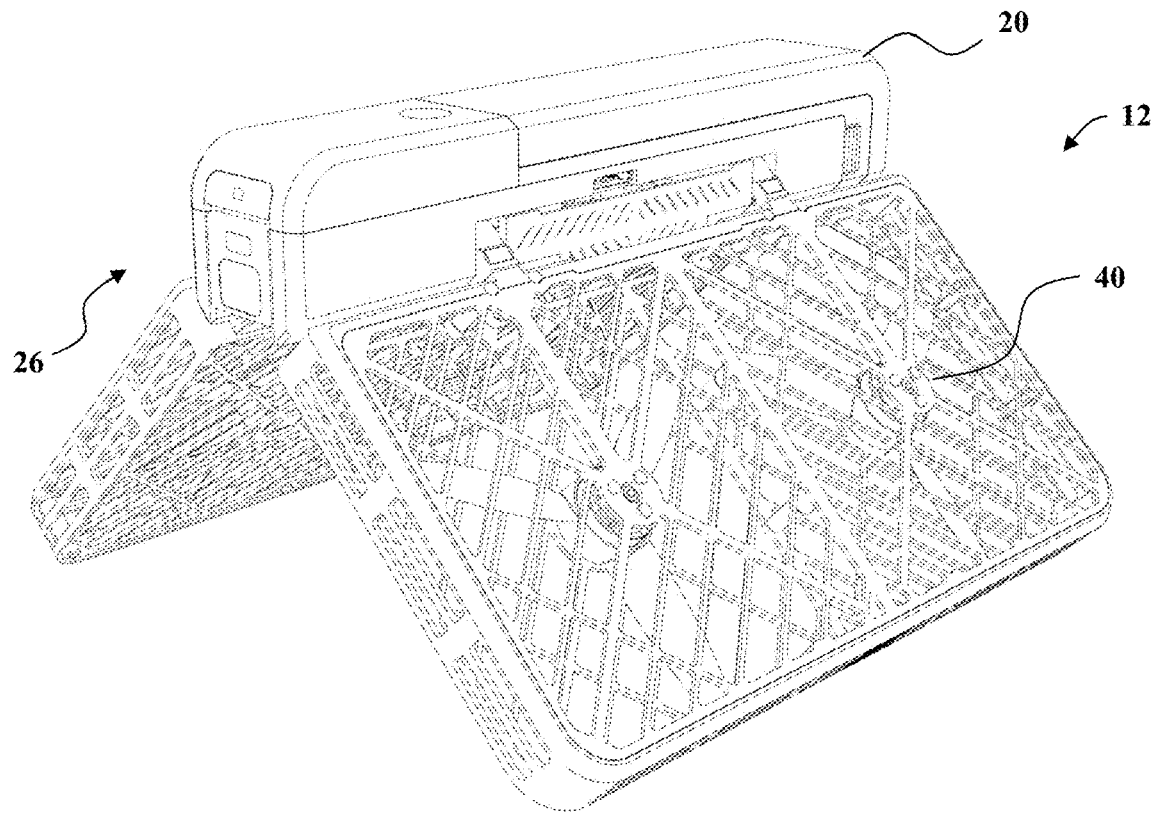
Figure 4:
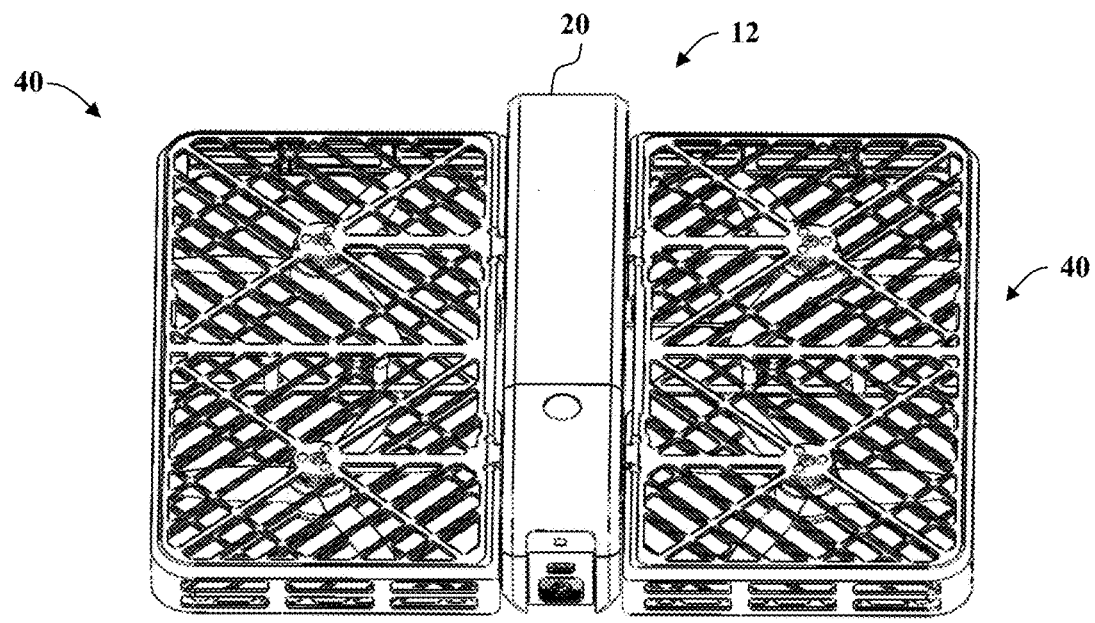
FIGS. 4-6 are perspective views of the unmanned aerial vehicle shown in FIG. 2, according to an embodiment of the present invention.
Figure 5:
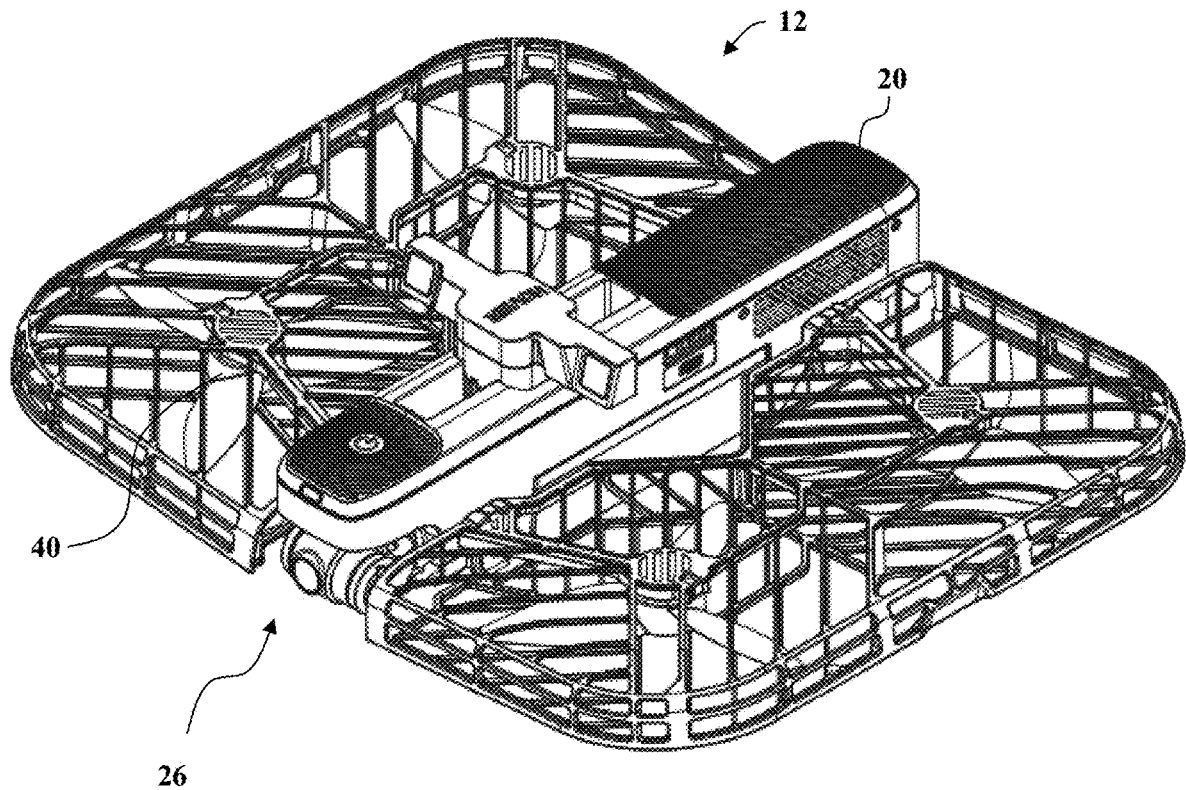
Figure 6:
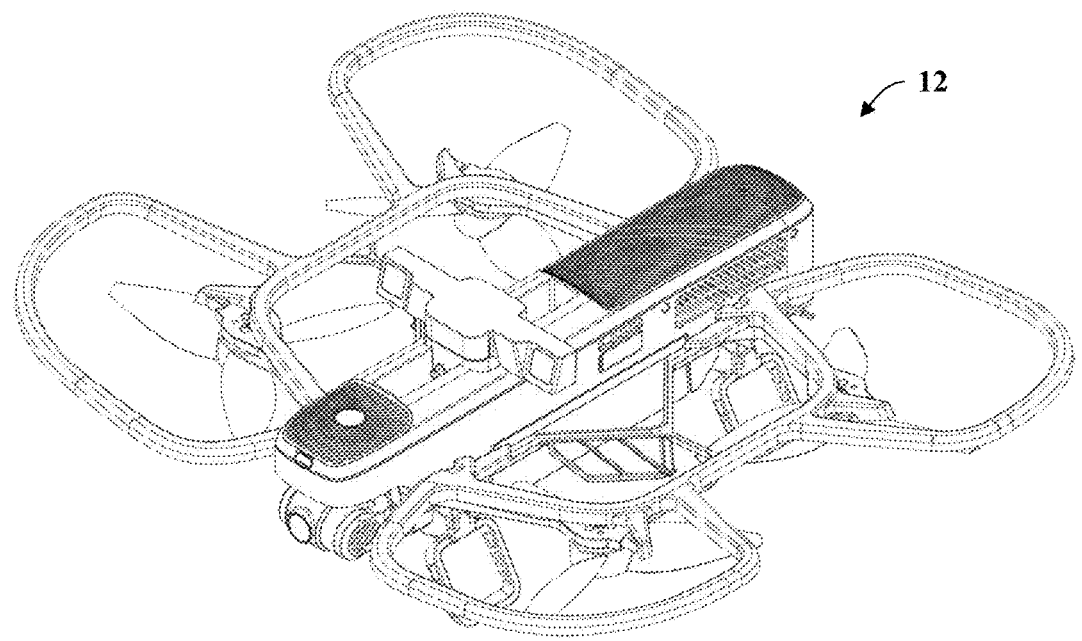
Figure 7:
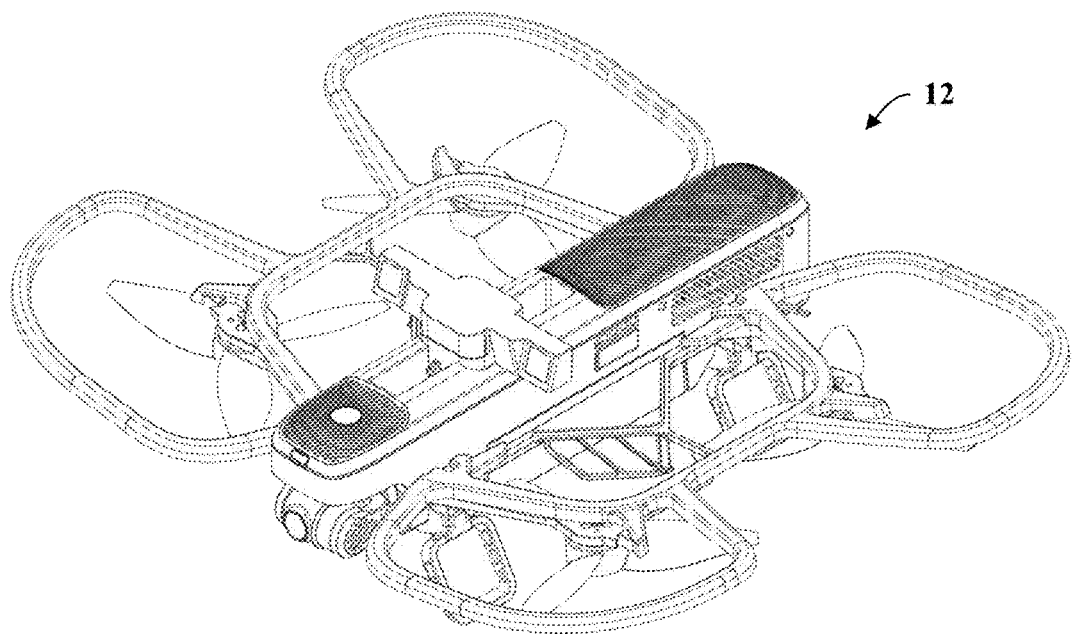
FIG. 7 is an exploded view of the unmanned aerial vehicle shown in FIG. 4.
Figure 8:
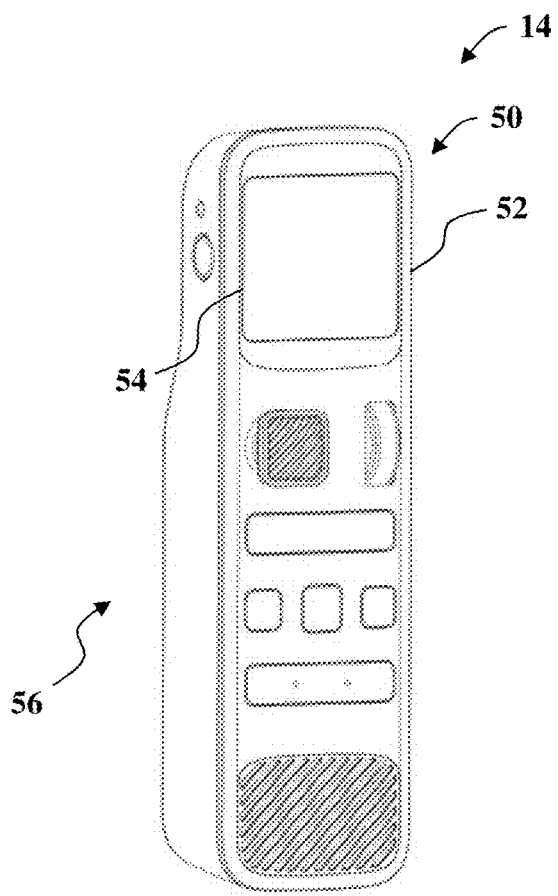
FIG. 8 is a perspective view of a remote-control device that may be used to operate the unmanned aerial vehicle show in FIGS. 2-7, according to an embodiment of the present invention.
Figure 9:
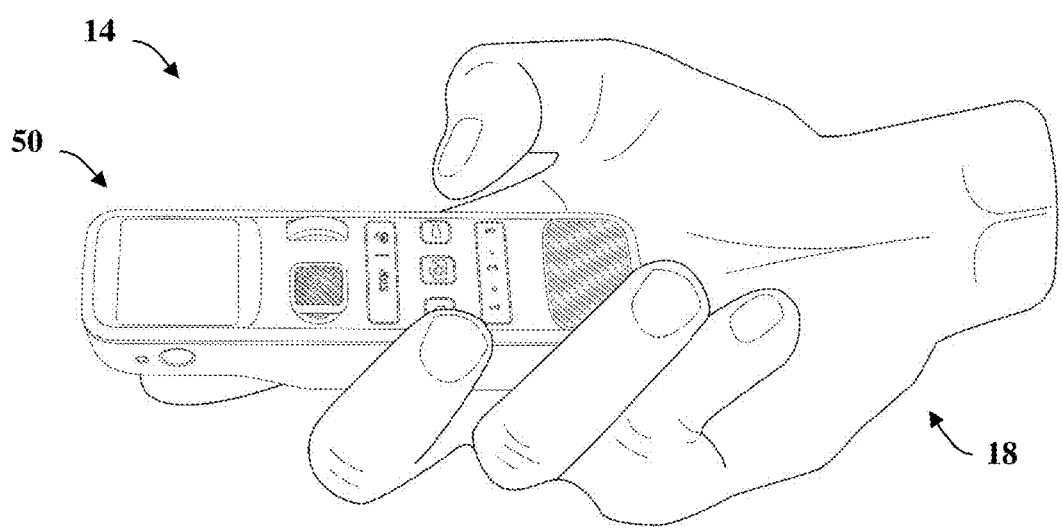
FIG. 9 is a perspective view of the remote-control device show in FIG. 8 being held by a hand of an operator.
Figure 10:
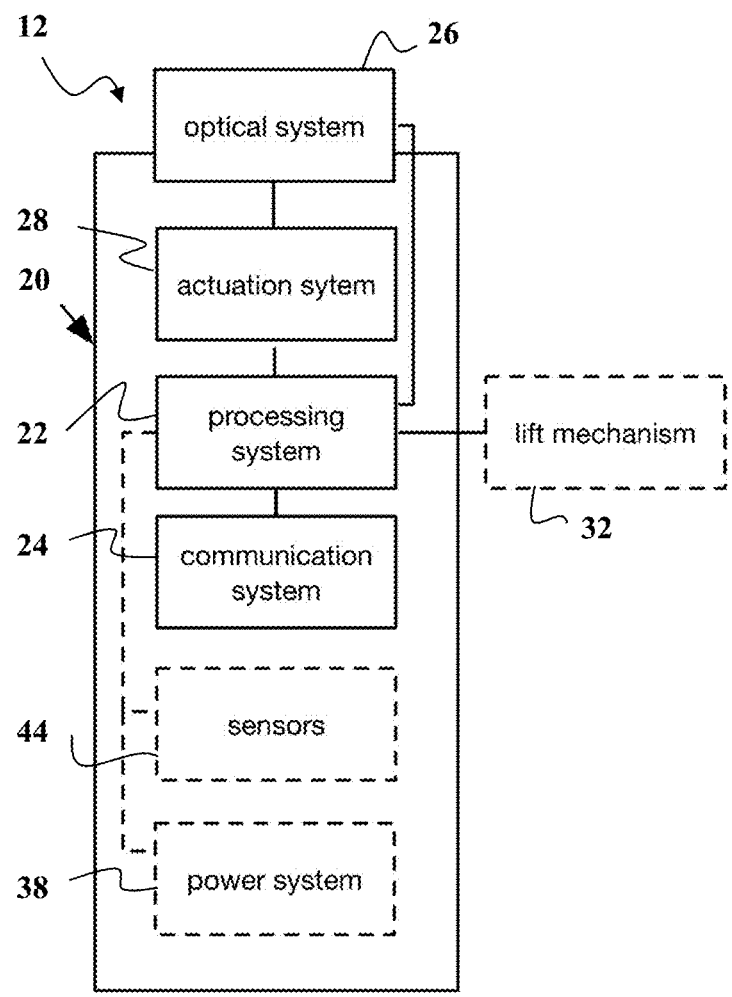
FIGS. 10-11 are schematic block diagrams of the unmanned aerial vehicle show in FIGS. 2-7, according to an embodiment of the present invention.
Figure 11:
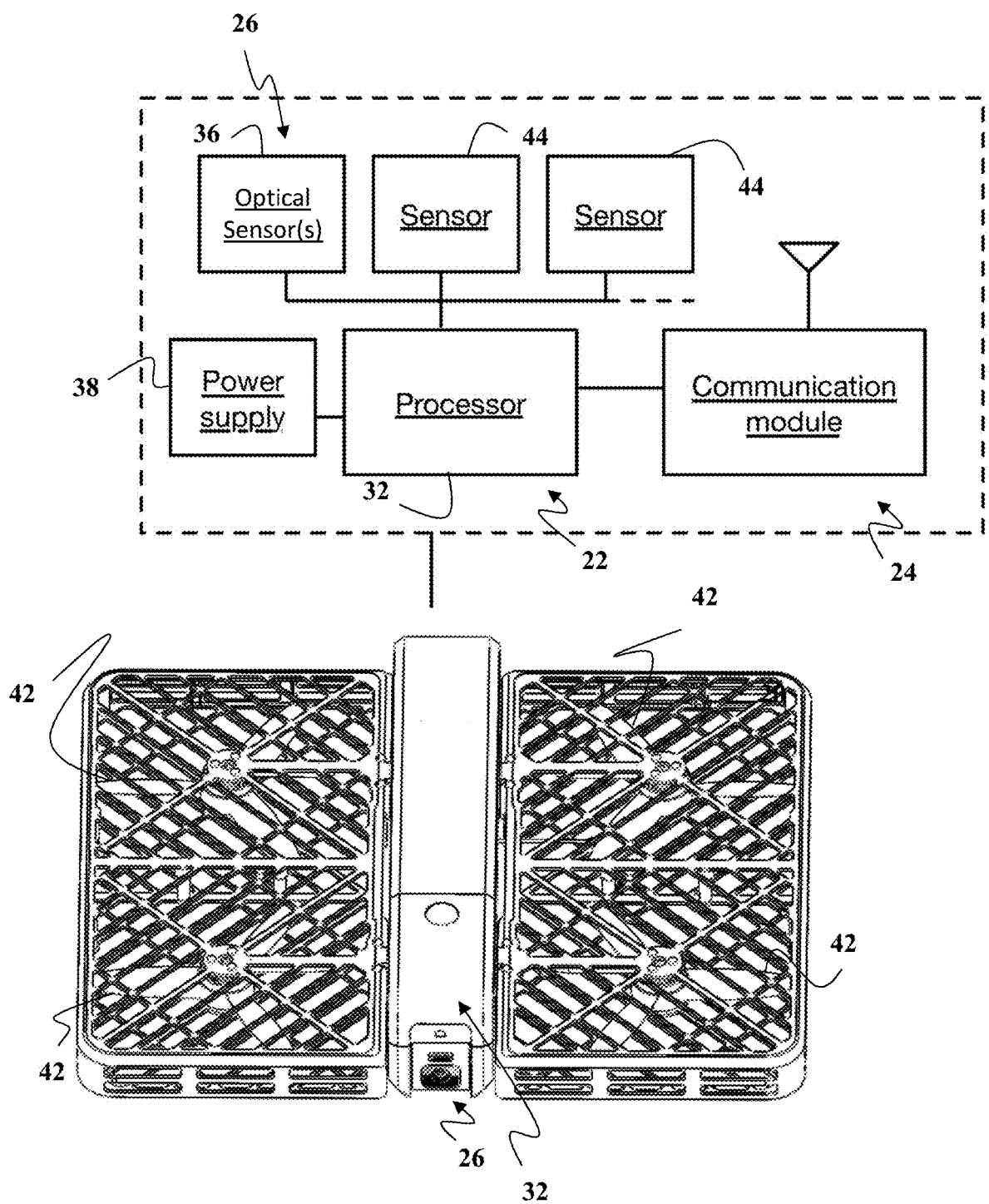

The following description of the embodiments of the invention is not intended to limit the invention to these embodiments, but rather to enable any person skilled in the art to make and use this invention. In general, the present invention overcomes the deficiencies of at least some know aerial drone systems by including a one-handed remote-controller for drones. This remote-controller enable users to control drone's directions and gimbal angles with single hand. This controller provides a new function, to command a drone auto-rotate to the designed orientation. This means if users press the assigned button on the controller, a drone will adjust its own orientation and rotate drone's head toward to where the controller is located. The new function will simplify a drone's operations, and help users save time from place to place. This remote-controller can stabilize drone's tracking function via its on-board sensors, which will reduce the lost tracking risk. It can also help to automatically re-locate the tracking object once the drone lost it. This invention supports one-handed control, it provides a much easier and intellectual method and design to operate multirotor drone devices remotely.

With reference to the drawings and in operation, the present invention is directed to a system 10 for use in operating an unmanned aerial vehicle (UAV) 12, for example an aerial drone. The control client 16 provides a user interface that allows a user 18 to send instructions to the aerial vehicle 12 to control operation thereof. As discussed in more depth below, the aerial vehicle 12 includes one or more cameras for obtaining pictures and/or video which may be sent to the remote device 14 and/or stored in memory on the aerial vehicle 12.

Alternatively, or in addition, the aerial vehicle 12 may include one or more sensors (see below) for detecting or sensing operations or actions, i.e., expressions, performed by the user 18 to control operation of the aerial vehicle 12 (see below) without direct or physical interaction with the remote device 14. In controller-free embodiments, the entire control loop from start (release and hover) to finish (grab and go), as well as controlling motion of the aerial vehicle 12 and trigger of events, e.g., taking pictures and video, are performed solely on board the aerial vehicle 12 without involvement of the remote device 14. In some such embodiments or systems 10, a remote device 14 may not be provided or included.

In further embodiments of the present invention, the aerial vehicle 12 through a control client 16 on the remote device 14 or through a user interface on the body of the drone or aerial vehicle 12, allows a user to select an action to be performed by the aerial vehicle 12. Once the action is selected, the drone lifts off, moves to a designated position, and performs the necessary steps to complete the selected action.

In some embodiments, the remote device 14 includes one or more sensors that detect or sense operation or actions performed by the user 18 to control operation of the aerial vehicle 12 without physical interaction with the remote device 14 under certain conditions, for example, when the aerial vehicle 12 is too far from the user 18.

An exemplary aerial vehicle 12 and system 10 is shown in FIGS. 1-12. The control client 16 of the aerial vehicle 12 functions to receive data from the aerial vehicle 12, including video images and/or video, and control visual display on the remote device 14. The control client 16 may also receive operation instructions and facilitate aerial vehicle 12 remote control based on operation instructions. The control client 16 is preferably configured to execute on a remote device 14, but can alternatively be configured to execute on the aerial vehicle 12 or on any other suitable system. As discussed above, and more fully below, the aerial vehicle 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial vehicle 12, store control client information (e.g., associated aerial system identifiers, security keys, user account information, user account preferences, etc.), or perform any other suitable functionality. The remote device 14 can be a user device (e.g., remote controller, smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial vehicle 12 functions to fly within a physical space, capture video, stream the video in near-real time to the remote device 14, and operate based on operation instructions received from the remote device 14.

The aerial vehicle 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial vehicle 12 can additionally function to move the optical sensor's field of view within the physical space. For example, the aerial vehicle 12 can control macro movements (e.g., large FOV changes, on the order of meter adjustments), micro movements (e.g., small FOV changes, on the order of millimeter or centimeter adjustments), or any other suitable movement.

As discussed in more detail below, the aerial vehicle 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As shown in FIGS. 2-11, the aerial vehicle 12 (e.g., drone) can include a body 20, a processing system 22, a communication system 24, an optical system 26, and an actuation mechanism 28 mounting the optical system 26 to the body 20. The aerial vehicle 12 can additionally or alternatively include lift mechanisms, sensors, power system, or any other suitable component (see below).

The body 20 of the aerial vehicle 12 functions to mechanically protect and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The processing system 22 of the aerial vehicle 12 functions to control aerial system operation. The processing system 22 includes a processor 32 coupled to a memory device for executing programs stored in the memory device. For example, the processor 32 may execute programs that cause the processor 32 to: receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 30 (e.g., CPU, GPU, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial vehicle 12 and mounted to the body 20, but can alternatively be otherwise related to aerial system components.

The communication system 24 of the aerial system functions to send and/or receive information from the remote device 14. The communication system 24 is preferably connected to the processing system 22, such that the communication system 24 sends and/or receives data form the processing system 22, but can alternatively be connected to any other suitable component. The aerial vehicle 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial vehicle 12 functions to record images of the physical space proximal the aerial vehicle 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 30, but can alternatively be connected to the communication system 24 or to any other suitable system. The optical system 26 can additionally include dedicated image processing hardware that automatically processes images recorded by the camera prior to transmission to the processor or other endpoint. The aerial vehicle 12 can include one or more optical systems 26 of same or different type, mounted to the same or different position. In one variation, the aerial vehicle 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical sensor 36 can be high-definition, while the second optical sensor 36 can be low definition. However, the optical system 26 can be otherwise configured.

The optical system 26 can include one or more optical sensors 36. The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial vehicle 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis 34 based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

A lift mechanism 40 of the aerial vehicle 12 functions to enable aerial system flight. The lift mechanism 40 preferably includes a set propeller blades 42 driven by a motor (not shown), but can alternatively include any other suitable propulsion mechanism. The lift mechanism 40 is preferably mounted to the body 20 and controlled by the processing system 22, but can alternatively be otherwise mounted to the aerial vehicle 12 and/or controlled. The aerial vehicle 12 can include multiple lift mechanisms 40. In one example, the aerial vehicle 12 includes four lift mechanisms 40 (e.g., two pairs of lift mechanisms 40), wherein the lift mechanisms 40 are substantially evenly distributed about the perimeter of the aerial vehicle 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial vehicle 12 (e.g., the physical space proximal the aerial vehicle 12), or any other suitable parameter. The sensors 44 are preferably mounted to the body 20 and controlled by the processing system 22, but can alternatively be mounted to any other suitable component and/or otherwise controlled. The aerial vehicle 12 can include one or more sensors 36, 44. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, or any other suitable sensor.

The power supply 38 of the aerial vehicle 12 functions to power the active components of the aerial vehicle 12. The power supply 38 is preferably mounted to the body 20, and electrically connected to all active components of the aerial vehicle 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

The methods described herein may be used with one or more aerial systems 12, and can optionally be used with the remote device 14, or with any other suitable system. The aerial vehicle 12 functions to fly, and can additionally function to take photographs, deliver loads, and/or relay wireless communications. The aerial vehicle 12 is preferably a rotorcraft (e.g., quadcopter, helicopter, cyclocopter, etc.), but can alternatively be a fixed-wing aircraft, aerostat, or be any other suitable aerial vehicle 12. The aerial vehicle 12 can include a lift mechanism 40, a power supply 38, sensors 36, 44, a processing system 22, a communication system 24, a body 20, and/or include any other suitable component.

The lift mechanism 40 of the aerial system functions to provide lift, and preferably includes a set of rotors driven (individually or collectively) by one or more motors. Each rotor is preferably configured to rotate about a corresponding rotor axis, define a corresponding rotor plane normal to its rotor axis, and sweep out a swept area on its rotor plane. The motors are preferably configured to provide sufficient power to the rotors to enable aerial system flight, and are more preferably operable in two or more modes, at least one of which includes providing sufficient power for flight and at least one of which includes providing less power than required for flight (e.g., providing zero power, providing 10% of a minimum flight power, etc.). The power provided by the motors preferably affects the angular velocities at which the rotors rotate about their rotor axes. During aerial system flight, the set of rotors are preferably configured to cooperatively or individually generate (e.g., by rotating about their rotor axes) substantially all (e.g., more than 99%, more than 95%, more than 90%, more than 75%) of the total aerodynamic force generated by the aerial system 1 (possibly excluding a drag force generated by the body 20 such as during flight at high airspeeds). Alternatively, or additionally, the aerial vehicle 12 can include any other suitable flight components that function to generate forces for aerial system flight, such as jet engines, rocket engines, wings, solar sails, and/or any other suitable force-generating components.

In one variation, the aerial vehicle 12 includes four rotors, each arranged at a corner of the aerial system body. The four rotors are preferably substantially evenly dispersed about the aerial system body, and each rotor plane is preferably substantially parallel (e.g., within 10 degrees) a lateral plane of the aerial system body (e.g., encompassing the longitudinal and lateral axes). The rotors preferably occupy a relatively large portion of the entire aerial vehicle 12 (e.g., 90%, 80%, 75%, or majority of the aerial system footprint, or any other suitable proportion of the aerial vehicle 12). For example, the sum of the square of the diameter of each rotor can be greater than a threshold amount (e.g., 10%, 50%, 75%, 90%, 110%, etc.) of the convex hull of the projection of the aerial vehicle 12 onto a primary plane of the system (e.g., the lateral plane). However, the rotors can be otherwise arranged.

The power supply 38 of the aerial system functions to power the active components of the aerial vehicle 12 (e.g., lift mechanism's motors, power supply 38, etc.). The power supply 38 can be mounted to the body 20 and connected to the active components, or be otherwise arranged. The power supply 38 can be a rechargeable battery, secondary battery, primary battery, fuel cell, or be any other suitable power supply.

The sensors 36, 44 of the aerial system function to acquire signals indicative of the aerial system's ambient environment and/or aerial system operation. The sensors 36, 44 are preferably mounted to the body 20, but can alternatively be mounted to any other suitable component. The sensors 36, 44 are preferably powered by the power supply 38 and controlled by the processor, but can be connected to and interact with any other suitable component. The sensors 36, 44 can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor. In one variation, the aerial vehicle 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number of any sensor type.

The processing system 22 of the aerial system functions to control aerial system operation. The processing system 22 can perform the method; stabilize the aerial vehicle 12 during flight (e.g., selectively operate the rotors to minimize aerial system wobble in-flight); receive, interpret, and operate the aerial vehicle 12 based on remote control instructions; or otherwise control aerial system operation. The processing system 22 is preferably configured to receive and interpret measurements sampled by the sensors 36, 44, more preferably by combining measurements sampled by disparate sensors (e.g., combining camera and accelerometer data). The aerial vehicle 12 can include one or more processing systems, wherein different processors can perform the same functionality (e.g., function as a multi-core system), or be specialized. The processing system 22 can include one or more: processors (e.g., CPU, GPU, microprocessor, etc.), memory (e.g., Flash, RAM, etc.), or any other suitable component. The processing system 22 is preferably mounted to the body 20, but can alternatively be mounted to any other suitable component. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial vehicle 12 functions to communicate with one or more remote devices 14. The communication system 24 can be a long-range communication module, a short-range communication module, or any other suitable communication module. The communication system 24 can facilitate wired and/or wireless communication. Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication system 24 or combination thereof. The communication system 24 is preferably powered by the power supply 38, but can be otherwise powered. The communication system 24 is preferably connected to the processing system 22, but can additionally or alternatively be connected to and interact with any other suitable component.

The body 20 of the aerial system functions to support the aerial system components. The body can additionally function to protect the aerial system components. The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22, and a first and second frame (e.g., cage) extending parallel the rotor rotational plane and arranged along a first and second side of the main body 20. The frames can function as an intermediary component between the rotating rotors and a retention mechanism (e.g., retention mechanism such as a user's hand). The frame can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The frames can be statically mounted or actuatably mounted to the main body 20.

The frame can include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 1 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial vehicle 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The aerial vehicle 12 can additionally include inputs (e.g., microphones, cameras, etc.), outputs (e.g., displays, speakers, light emitting elements, etc.), or any other suitable component.

The remote computing system functions to receive auxiliary user inputs, and can additionally function to automatically generate control instructions for and send the control instructions to the aerial system(s) 12. Each aerial vehicle 12 can be controlled by one or more remote device 14. The remote device 14 preferably controls the aerial vehicle 12 through the client 16 (e.g., a native application, browser application, etc.), but can otherwise control the aerial vehicle 12. The remote computing system can be a user device, remote server system, connected appliance, or be any other suitable system. Examples of the user device include a remote controller, tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

Figure 12:
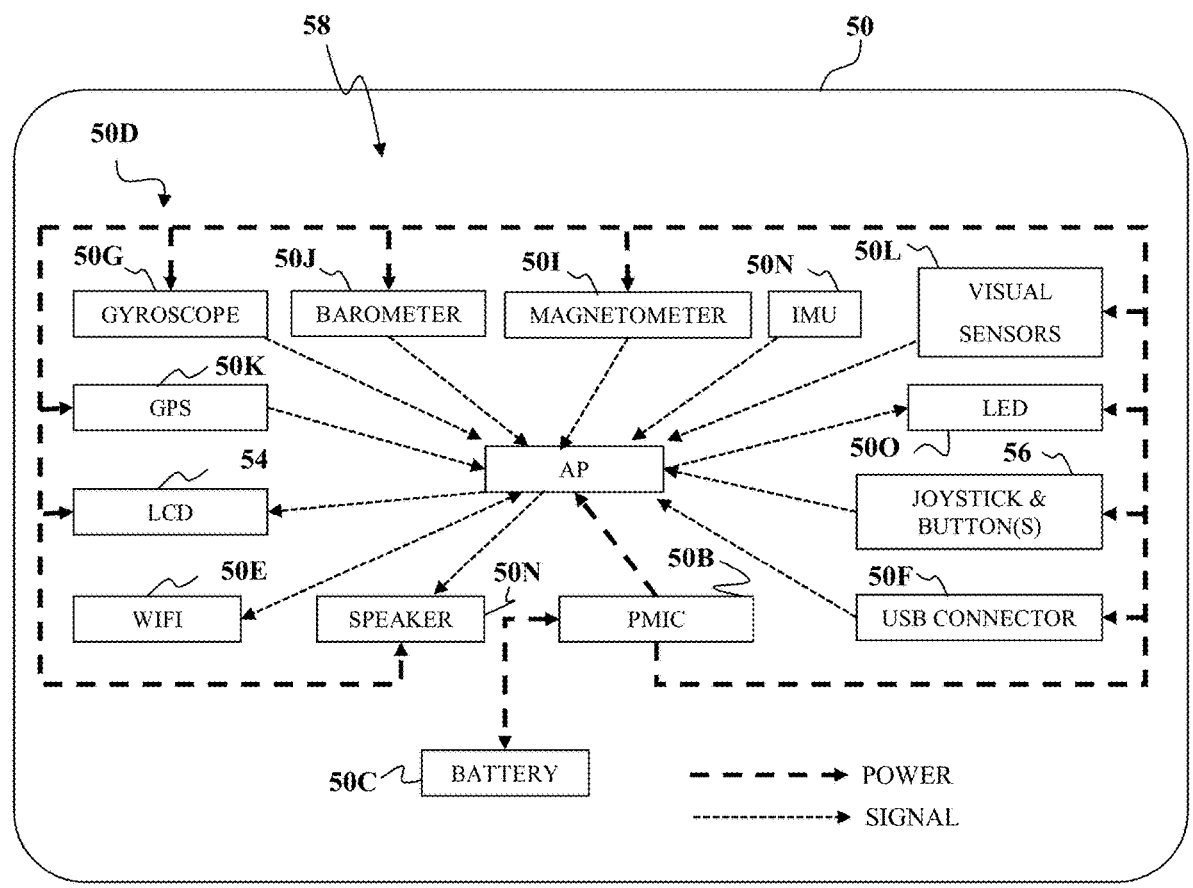
FIG. 12 is a schematic block diagram of the remote-control device shown in FIGS. 8-9, according to an embodiment of the present invention.

Referring to FIGS. 8, 9, 12, 17, and 18, in the illustrated embodiment, the remote device 14 includes a hand-held remote controller device 50. The remote controller device 50 includes a housing 52, an LCD screen 54 mounted to an outer surface of the housing 52, a plurality of user inputs devices 56 defined along the outer surface of the housing 52, and a plurality of hardware components 58 disposed within the housing 52. An exemplary configuration of the remote controller hardware is shown in FIG. 12. In the exemplary configuration of FIG. 12, the remote controller device 14 includes an application processor (AP) 50A, a power management IC (PMIC) 50B, battery 50C, a controller device sensor unit 50D (including a plurality of on-board sensor modules, see below), a wireless communication module 50E, and user interaction components. The application processor 50A is the main processing unit taking charge of varies tasks including processing the raw data from sensor modules, collecting command signals from user interaction inputs for sending them wirelessly via the wireless communication module 50E (Wi-Fi, Bluetooth, 4G/LTE, etc.) to the unmanned aerial vehicle or drone 12, meanwhile receiving video streaming and drone status from the unmanned aerial vehicle 12. The power management IC 50B may connect a charging port (such as USB port) 50F to a battery unit. A\also the PMIC 50B can distribute and supply the battery power to all hardware components with different voltage input requirements (1.8V/3.3V/5V etc.). The on-board sensor modules may include one or more of the following: an accelerometer 50G, a gyroscope 50H, a magnetometer 50I, a barometer 50J, a GPS receiver 50K, visual sensors 50L, etc.; The user interaction inputs 50M may include push buttons, wheel buttons, joysticks, motion information, etc.; user interaction outputs 50N may include speaker, LCD screen, vibration motor, etc. The LCD screen can be used for displaying user interaction units, streaming video, preview captured photo/video, etc.

Firmware and software of the core system may be built upon an operating system such as Linux, real-time operating system (RTOS), etc. Typically the firmware and software are comprised of various levels of code, for example, with low level driver layer, module layer, and application layer. Low level driver layer provides software access to hardware devices for upper layers to call via their application program interfaces (API). Low level functions may include read/write registers from a device, copy data from memory/flash to memory/flash addresses, etc. Module layer calls the APIs provided by low level driver layer to build modular (higher) level functions for items like joysticks, LCD, wireless communication module, etc. Higher level functions may include detecting a joystick moving to a direction, lighting LCD screen to display a certain interface, computing the attitude of the device with sensor fusion algorithms, sending a chunk of data to a remote device via wireless communication module, etc. Application layer combines the modules together to implement designated overall applications.

Figure 17:
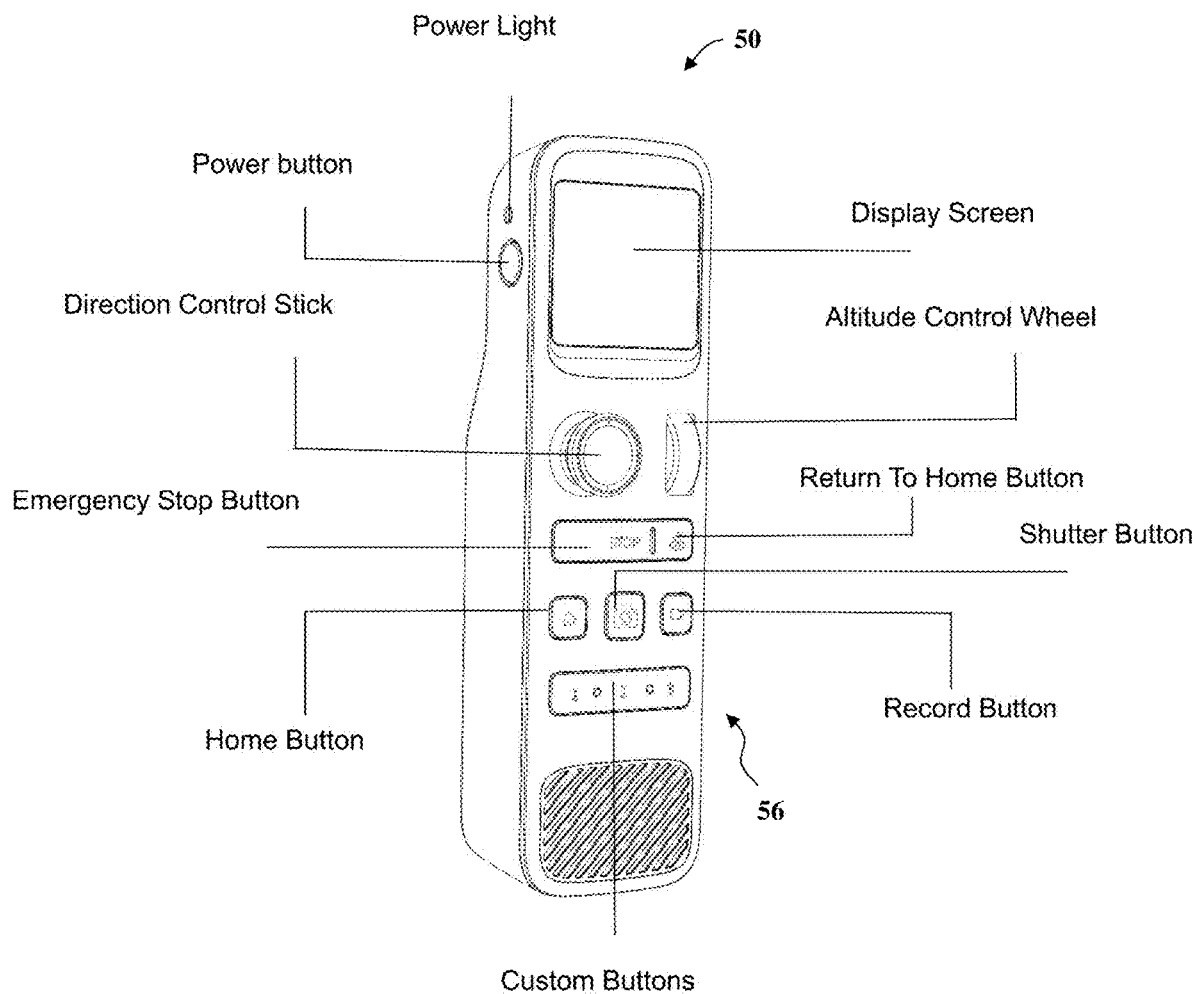
FIGS. 17 and 18 are perspective views of the remote-control device show in FIG. 8, according to an embodiment of the present invention.
Figure 18:
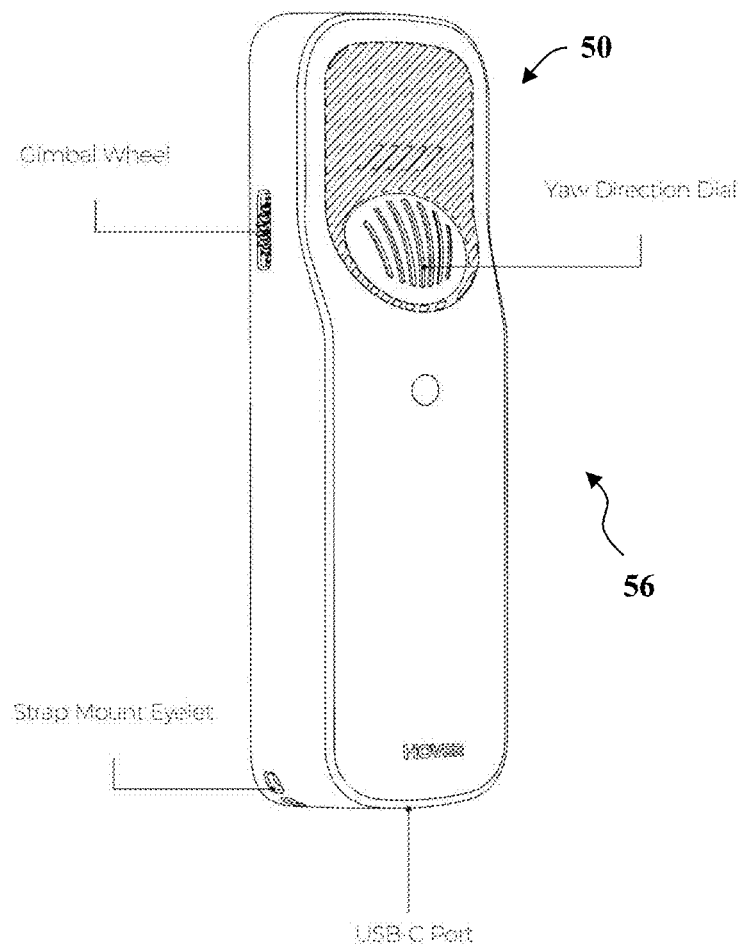

With reference to FIG. 17, in the illustrated embodiment, the plurality of user inputs devices 56 includes a Power button, a Home button, a Shutter button, a Record button, an Emergency Stop button, a Return to Home button, a Direction Control stick, an Altitude Control wheel, a Yaw Direction dial, a Gimbal wheel, three custom buttons, and a USB-C Port. The Power button: to power on: the user keeps pressing the power button for at least 2 seconds. (ex: if the user keeps pressing the power button for 5 seconds, the controller will power on when the pressing time reaches 2 seconds.); to power off: the user keeps pressing the power button for at least 2 seconds. The Home button: the user clicks the Home button for once will exit the current flight mode and return to the home page. In the home page, user can choose different flight modes. The Shutter button: a single click the shutter button, the drone will take one photo; keep pressing the camera button, the drone will take photos continuously. The number of consecutive shots is the maximum number drone can shoot per second. The Record button: to start to record the video: single click the record button; to stop the recording: single click the record button. Equal to the start & stop button in follow mode and trackshots mode. The Emergency Stop button: the user presses the Emergency Stop button to change the drone status from flying to hovering (in any mode). The Return to Home button: press the Return to Home button in any mode, the drone start to return; press the Return to Home button again during the return, the return process will stop. The Direction Control stick: the Directional Control stick can rotate to all directions, able to control drone's horizontal movement including forward/backward/left/right; The Directional Control stick will automatically return to the center if no force is added; the flight speed of drone is controllable, which is related to the extent of rocker fluctuation. The smaller the fluctuation, the smaller the speed, vice versa. 1. The stick can be pressed. User can shortly press the stick to confirm which flying mode be chosen; 2. The control function of stick can rotate to all directions, able to control drone's horizontal movement including forward/backward/left/right, when the stick is been pressed. The Altitude Control wheel: the Altitude Control wheel is used to control drone's vertical movement, including up and down; the wheel will automatically return to the center if no force is added; the flight speed of drone is controllable, which is related to the extent of wheel fluctuation. The smaller the fluctuation, the smaller the speed, vice versa. The Yaw Direction dial: the Yaw Direction dial is used to control drone's movement on yaw direction; the dial will automatically return to the center if no force is added. The flight speed of drone is controllable, which is related to the extent of dial fluctuation. The smaller the fluctuation, the smaller the speed, vice versa. The Gimbal wheel: the Gimbal wheel is used to control drone's gimbal movement; the wheel will not automatically return to the center if no force is added; the gimbal move speed is fixed. The three custom buttons: each button can represent one projected trajectory (user select the preferred trajectory from candidate choices). When the drone is hovering/flying in follow mode or trackshots mode, press one of the custom buttons, drone will fly along to the appointed projected trajectory. The custom buttons can be combined to represent new projected trajectory. Combinations include button 1&2, 1&3 or 2&3. Press the combined two buttons together, drone will fly along to the appointed projected trajectory. The USB-C Port: The USB-C port is used to charge the controller via this port and access the controller to laptop/computer via this port, to upgrade controller's firmware. The LCD screen may display controller battery level; drone battery level; Wi-Fi connection signal; transferred preview image from the drone.

As discussed above, the remote controller device 14 provides a plurality of one-handed control of the unmanned aerial vehicle 12. The controller device sensor unit 50D is located within the controller device housing 52 and is configured to sense position and/or orientation of the remote controller device 14. The application processor 50A is programmed to: (1) receive an input from the user via the input device 50M indicating a flight command requested by the user, (2) determine a current position and/or orientation of the remote controller device 14 as a function of the sensed position and/or orientation of the remote controller device 14 upon receiving the flight command from the user, and (3) send a flight command signal to the unmanned aerial system 12 in response to receiving the input from the user via the user input device 50M. In one embodiment of the present invention, the flight command signal to the unmanned aerial system 12 in response to solely receiving the input from the user via the user input device 50M, i.e., no other action is required by the user. The processing system 22 of the unmanned aerial vehicle 12 is programmed to execute a program to perform the algorithm steps of: (1) receiving the flight command signal from the remote controller device, (2) receiving the current position and/or orientation of the remote controller device from the remote controller device and responsively determining a desired orientation of the unmanned aerial vehicle as a function of the current position and/or orientation of the remote controller device, and (3) operate the lift mechanism to execute a flight operation based on the desired orientation of the unmanned aerial vehicle and the current position of the remote controller device.

In one aspect of the present invention, the flight operation includes a "one-click" or single operation aiming feature. For example, one typical function of the one-handed remote controller device 14 is to adjust the unmanned aerial vehicle's facing direction automatically towards the user. This is referred to as the "one-clicking device aiming" feature. The on-board sensors (see below) are used to determine the attitude and heading directions of both the hand-held remote controller and the unmanned aerial vehicle 12. In one embodiment, as the user performs an aiming action with the remote controller device 14 towards the unmanned aerial vehicle 12, the heading direction of the remote controller device 14 is calculated and sent wirelessly to the unmanned aerial vehicle 12. Then, the processing system 22 of the unmanned aerial vehicle 12 adjust the orientation (yaw) of the unmanned aerial vehicle 12 to the reverse direction of the remote controller device 14 in order to horizontally aim the camera or optical sensors on the unmanned aerial vehicle 12 toward the remote controller device 12 and the user. The gimbal module on the unmanned aerial vehicle 12 may be used to further adjust the pitch angle of the camera or optical camera to more precisely aim the unmanned aerial vehicle 12 toward the remote controller device 14 and the user (especially when there is a height difference between the unmanned aerial vehicle 12 and the user).

In one embodiment of the present invention, the processing system 22 of the unmanned aerial vehicle 14, in response to receiving the flight command signal from the application processor 50A of the remote controller device 14 controls the lift mechanism 32 to adjust an orientation of the aerial body 20 as a function of the desired orientation of the current controller orientation data received from the remote controller device 14.

In another aspect of the present invention, the processing system 22 of the unmanned aerial vehicle 12 controls the lift mechanism 32 to rotate the unmanned aerial device 12 such that the aerial device 12 is facing in a direction towards the remote controller device 14.

The unmanned aerial vehicle 12 may further include an optical sensor 26 coupled to the aerial vehicle body 20 by an actuation mechanism 28 coupled to the processing system 22. The processing system 22 of the unmanned aerial vehicle 12 may be further configured to rotate the optical sensor 26 about one or more axes associated with the aerial vehicle body 20 to orientate the optical sensor towards the remote controller device 14 in response to the processing system 22 receiving the flight command signal.

As discussed above, in use, the user may first orientate the remote controller device 14 towards the unmanned aerial vehicle 12 and actuates the input device 50M. In this use case, the desired orientation of the unmanned aerial vehicle 12 is opposite the determined operation of the remote controller device 14.

Another feature of the one-handed controller is the referred to as the "directed velocity control" feature. In the directed velocity control feature, the unmanned aerial vehicle 12, is controlled to fly along an aiming direction of remote controller device 14, e.g., when user pushes on a specific button. Compared to the body velocity control of the conventional two-handed controller, this feature would make it much easier for inexperienced user to enjoy the fun of drone flying. In other words, the flight operation includes operating the unmanned aerial vehicle in a flight path defined by the determined current orientation of the remote controller device 14.

In one embodiment, the processing system 22 of the unmanned aerial vehicle 12 controls the lift mechanism 32 to fly the unmanned aerial vehicle 12 along the flight path defined by the current orientation of the remote controller device 14 while the input 50M is being actuated. In another embodiment, the processing system 22 of the unmanned aerial vehicle 12 controls the lift mechanism 32 to fly the unmanned aerial vehicle 12 along the flight path for a predetermined time (after the input 50M has been actuated).

In still another feature, the unmanned aerial vehicle 12 and the (one-handed) remote controller device 14 are configured to obtain relative position and velocity of the unmanned aerial vehicle 12 with respect to the remote controller device 14 (and the user). Using state-of-the-art trajectory generation and tracking algorithms (see below). In this feature, the unmanned aerial vehicle 12 may be configured to perform various trajectory tracking tasks when the user pushes the trajectory button. In other words, the flight operation may include a predetermined flight trajectory based on the determined current position of the remote controller device. For example, the predetermined flight trajectory may include one or more of the following:

a circular trajectory in which the unmanned aerial vehicle travels along a circled centered on the remote controller device;

a spiral trajectory in which the unmanned aerial vehicle travels along a spiral centered on the remote controller device;

a direct ascent or descent trajectory in which the unmanned aerial vehicle travels straight up or down; and, a user defined trajectory.

Figure 13:
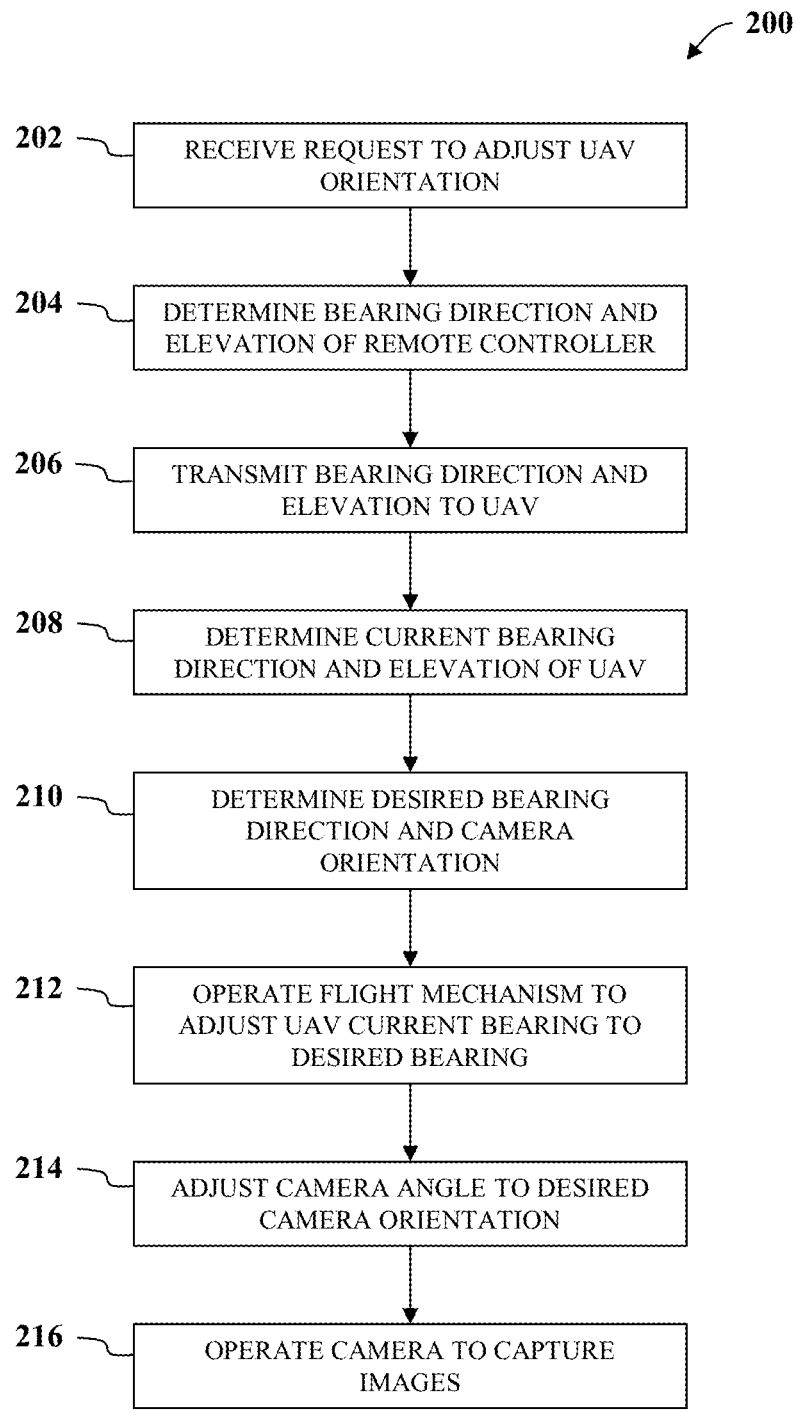
FIG. 13 is a flowchart illustrating an algorithm method for use in operating the unmanned aerial vehicle shown in FIGS. 2-7, according to an embodiment of the present invention.
Figure 14:
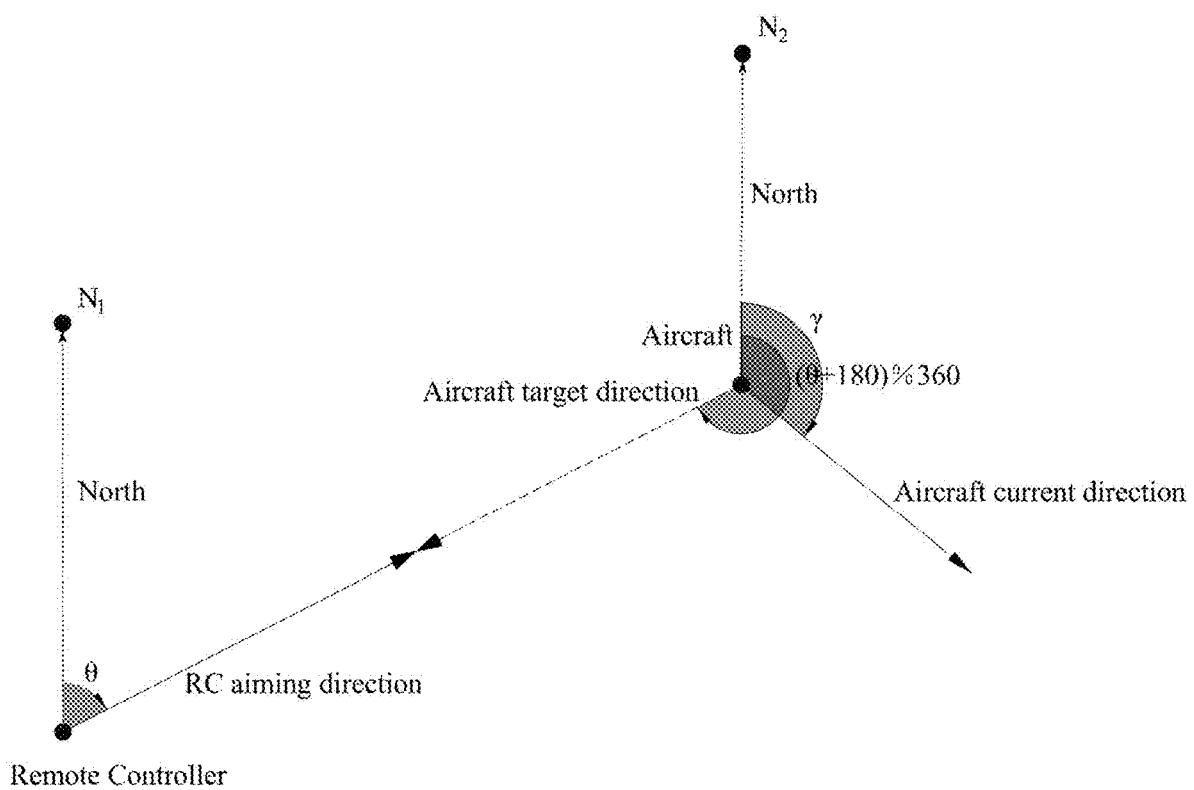
FIG. 14 is a graphic illustration of the operation of the unmanned aerial vehicle during execution of the algorithm method show in FIG. 13.

FIGS. 13-14 illustrate an algorithm method 200 that may be implemented by the application processor of the remote controller device 50 and/or the processing system 22 of the aerial vehicle 12 for use in operating the aerial vehicle 12 to implement a One-Click Aiming Feature function. The method 200 includes a plurality of steps. Each method step may be performed independently of, or in combination with, other method steps. Portions of the method 200 may be performed by any one of, or any combination of, the components of the remote controller device 50 and/or the aerial vehicle 12.

In method step 202, the remote controller device 50 receives a request to adjust an orientation of the aerial vehicle 12 from the user 18. For example, in one embodiment, the plurality of user input buttons on the remote controller device 50 may include an aiming button that is depressed by the user 18 when the user 18 desires to adjust an orientation of the aerial vehicle 12. In method step 204, the application processor of the remote controller device 50 determines a geographic location, bearing direction and elevation of the remote controller device 50. For example, the processor may access signals from the gyroscope, magnetometer, barometer, and/or GPS of the remote controller device 50 for use in determining the geographic location, bearing direction and elevation of the remote controller device 50. In method step 206, the remote controller device 50 then transmits data indicating the determined geographic location, bearing direction and elevation of the remote controller device 50 to the aerial vehicle 12. In one embodiment, the remote controller device 50 may transmit data received from the gyroscope, magnetometer, barometer, and/or GPS to the aerial vehicle 12 to enable the processing system 22 of the aerial vehicle to determine the geographic location, bearing direction and elevation of the remote controller device 50.

In method step 208, the aerial vehicle 12 receives a command signal from the remote controller device 50 indicating the user's request to adjust an orientation of the aerial vehicle 12, and determines a current orientation of the aerial vehicle 12. For example, in one embodiment, upon receiving the command signal from the remote controller device 50, the processing system 22 of the aerial vehicle 12 may access data from the sensors 44 for use in determining the geographic location, bearing direction and elevation of the aerial vehicle 12.

In method step 210, the processing system 22 of the aerial vehicle 12 determines a desired orientation of the aerial vehicle 12 to face the remote controller device 50. For example, in one embodiment, the processing system 22 receives signals from the remote controller device 50 indicating the geographic location, bearing direction and elevation of the remote controller device 50, determines the desired orientation of the aerial vehicle 12 based on the geographic location, bearing direction and elevation of the remote controller device 50, and calculates a yaw angle adjustment based on a current orientation of the aerial vehicle 12 and the desired orientation of the aerial vehicle 12. In addition, in one embodiment, the processing system 22 may calculate an adjustment to an orientation angle of the camera 36 based on the elevation of the remote controller device 50. The command signal may include the data indicating the geographic location, bearing direction and elevation of the remote controller device 50, and/or may include data retrieved from the gyroscope, magnetometer, barometer, and/or GPS of the remote controller device 50.

In method step 212, the processing system 22 operates the lift mechanism 40 to perform a flight operation to adjust a yaw angle of the aerial vehicle 12 to orientate a bearing direction of the aerial vehicle 12 along the desired bearing direction facing the remote controller device 50. In method step 214, the processing system 22 operates the actuation system 28 to adjust an orientation of the camera 36 towards the remote controller device 50. For example, the processing system 22 may calculate the elevation difference between the elevation of the remote controller device 50 and the elevation of the aerial vehicle 12 to direct a viewing angle of the camera 36 towards the remote controller device 50.

In method step 216, upon completion of the flight operation and camera orientation adjustment, the processing system 22 operates the camera 36 to capture video images of an area associated with location of the remote controller device 50 and/or user 18.

Referring to FIG. 14 illustrating the One-Click Aiming Feature: one typical function of this one-handed controller 50 is to adjust the drone's facing direction automatically to the user, which is called one-clicking aiming feature. The principle is to utilize on-board sensors to determine the attitude and heading directions of both the hand-held remote controller and the aircraft. As a user performs an aiming action with the remote controller towards the aircraft, the heading direction of the remote controller is calculated and sent wirelessly to the aircraft. Then the aircraft can adjust its orientation (yaw) to the reverse direction of the remote controller in order to horizontally aim the camera on the aircraft toward the remote controller and the user. The gimbal module on the aircraft can further adjust the pitch angle of the camera to more precisely aim toward the remote controller and the user, especially when there is a height difference between the aircraft and the user.

The geographic orientation angle of a device can be described as the angle between north direction and the heading direction of the device. As shown in FIG. 14, θ is the geographic orientation angle of the remote controller as the user performs an aiming action with the remote controller towards the aircraft; and the original aircraft aiming direction (with its onboard camera) is γ. The aircraft needs to rotate to a geographic orientation angle of α=((θ+180) mod 360) deg. in order to aim toward the remote controller. Here mod or "%" is a modulo operator. The angle difference between original aircraft direction and the target aircraft direction is ((α−γ) mod 360) deg clockwise, or (360−(α−γ) mod 360) deg counterclockwise. The aircraft may choose a shorter path to turn horizontally toward the remote controller.

Vertical angle aiming can be simply achieved by adjusting the pitch angle of the camera gimbal module on the aircraft, giving the pitch angle component of the Euler angles of the remote controller. The Euler angles can be set as Tait-Bryan angles in Z-Y'-X" form. Assume the pitch angle component of the Euler angles of the remote controller is φ, then the pitch angle of the camera gimbal module should be adjusted to −φ to aim toward the target.

Figure 15:
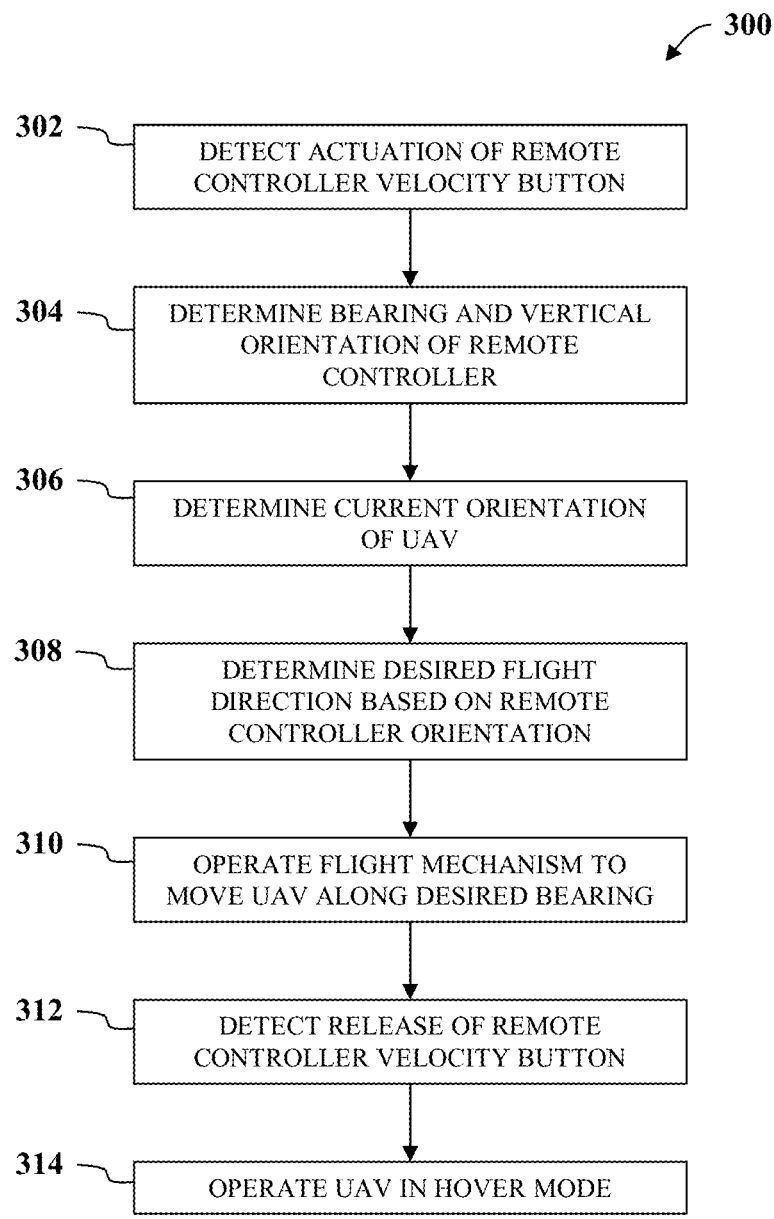
FIG. 15 is a flowchart illustrating another algorithm method for use in operating the unmanned aerial vehicle shown in FIGS. 2-7, according to an embodiment of the present invention.
Figure 16:
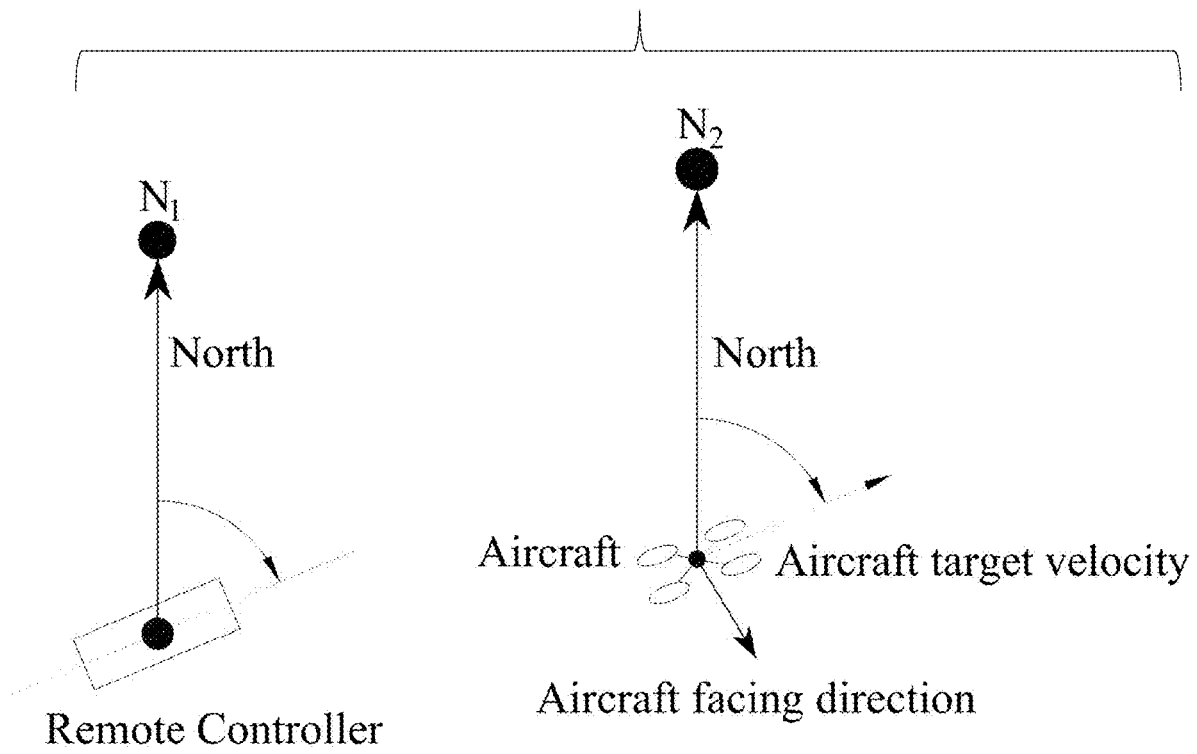
FIG. 16 is a graphic illustration of the operation of the unmanned aerial vehicle during execution of the algorithm method show in FIG. 15.

FIGS. 15-16 illustrate an algorithm method 300 that may be implemented by the application processor of the remote controller device 50 and/or the processing system 22 of the aerial vehicle 12 for use in operating the aerial vehicle 12 to implement a One-Hand Velocity Control Feature function. The method 300 includes a plurality of steps. Each method step may be performed independently of, or in combination with, other method steps. Portions of the method 300 may be performed by any one of, or any combination of, the components of the remote controller device 50 and/or the aerial vehicle 12.

In method step 302, the remote controller device 50 receives a request to adjust a geographic location of the aerial vehicle 12 from the user 18. For example, in one embodiment, the plurality of user input buttons on the remote controller device 50 may include a velocity button that is depressed by the user 18 when the user 18 desires to operate the aerial vehicle 12 to accelerate flight along a desired direction.

In method step 304, the application processor of the remote controller device 50 determines a 3-dimensional orientation of the remote controller device 50. For example, the processor may access signals from the gyroscope, magnetometer, barometer, and/or GPS of the remote controller device 50 for use in determining the horizontal bearing and vertical orientation angle of the remote controller device 50. The remote controller device 50 then transmits data indicating the determined horizontal bearing and vertical orientation angle of the remote controller device 50 to the aerial vehicle 12. In one embodiment, the remote controller device 50 may transmit data received from the gyroscope, magnetometer, barometer, and/or GPS to the aerial vehicle 12 to enable the processing system 22 of the aerial vehicle to determine the horizontal bearing and vertical orientation angle of the remote controller device 50.

In method step 306, the aerial vehicle 12 receives a command signal from the remote controller device 50 indicating the user's request to adjust the geographic location of the aerial vehicle 12, and determines a current orientation of the aerial vehicle 12. For example, in one embodiment, upon receiving the command signal from the remote controller device 50, the processing system 22 of the aerial vehicle 12 may access data from the sensors 44 for use in determining the current geographic location, bearing direction and elevation of the aerial vehicle 12.

In method step 308, the processing system 22 of the aerial vehicle 12 determines a desired flight direction of the aerial vehicle 12 based on the determine orientation of the remote controller device 50. For example, in one embodiment, the processing system 22 receives signals from the remote controller device 50 indicating the 3-dimensional orientation of the remote controller device 50 and determines a desired flight direction matching the orientation of the remote controller device 50.

In method step 310, the processing system 22 operates the lift mechanism 40 to perform a flight operation to accelerate a flight of the aerial vehicle 12 along the determined desired flight direction. For example, the processing system 22 determines the different between the desired flight direction and the current orientation of the aerial vehicle 12, and operates the lift mechanism 40 to the aerial vehicle along the desired flight direction without adjusting a current bearing direction of the aerial vehicle 12.

In method steps 312 and 314, the processing system 22 detects a release of the velocity button by the user and operates the aerial vehicle 12 in a hover mode flight operation upon detecting the release of the velocity button. During the hover mode flight operation, the processing system 22 operates the flight mechanism to maintain the current geographic location, bearing, and elevation of the aerial vehicle. For example, in the illustrated embodiment, the processing system 22 operates the aerial vehicle 12 along the determined desired flight direction upon receiving a signal from the remote controller device 50 indicating the velocity button has been depressed by the user, and continues to fly the aerial vehicle 12 along the determined desired flight direction until the user has released the velocity button.

The hover mode preferably includes a flight mode in which the aerial system position in the air (e.g., vertical position, lateral position, etc.) is substantially maintained, but can alternatively be any other suitable flight mode. The flight mode preferably includes maintaining an aerial system orientation such that a central axis normal to a lateral plane of the aerial system 12 is substantially parallel to a gravity vector (e.g., within 20°, within 10°, within 3°, within 1°, etc.). However, the central axis can be otherwise maintained. The flight mode preferably includes generating a force at the lift mechanism 40 equal and opposite the force exerted on the aerial system12 by gravity (e.g., to hover), but can alternatively include generating a vertical force greater or lesser than the gravitational force (e.g., to increase or decrease altitude, and/or to arrest vertical movement and bring the aerial system 12 into a hovering state). The flight mode can additionally or alternatively include generating a non-vertical force and/or a torque (e.g., to change the aerial system pitch or roll, to cause or arrest lateral movement, etc.). For example, the flight mode can include detecting an orientation, position, and/or velocity change, determining that the change is due to wind and/or another external perturbation such as a collision (e.g., classifying the change as a wind and/or collision event, determining a probability of wind perturbation, determining a probability of the perturbation being a grab event, etc.), and operating the lift mechanism 40 to correct for the change and return to an original or desired position, orientation, and/or velocity.

Referring to FIG. 16 illustrating the One-Hand Velocity Control Feature: another feature of the one-handed controller 50 is the directed velocity control feature, where the drone would fly along the aiming direction of this controller when user pushes on the specific button. Compared to the body velocity control of the conventional two-handed controller, this feature would make it much easier for inexperienced user to enjoy the fun of drone flying. The solution of this feature is illustrated in FIG. 16. Assuming that the controller reference frame and the drone reference frame are both geographical frame. When the controller X-axis is pointed along a specific direction, the drone would recognize the corresponding direction, and move along this direction until the velocity button is released. During this process, the yaw angle of the drone remains unchanged.

In one embodiment, the processing system 22 may be programmed to execute an Advanced User Localization Feature function. The One-Click Aiming Feature and the One-Hand Velocity Control Feature may be implemented based on proper tracking of the user who holds the one-handed controller. For conventional two-handed controller, this can be realized only through visual tracking of the onboard camera. However, instead of tracking the user using only visual features, the system 10 may employ different type of sensors for the one-handed controller. In one embodiment of the invention, both the remote controller and the aircraft are equipped with MEMS sensors including sonar, magnetometer, accelerometer, gyroscope, barometer, and GPS module. With all sensors pre-calibrated, a sensor fusion algorithm is performed to obtain both the attitude and geographic orientation of the device. Depending on the specific application, the following methods would be used:

1. For the attitude estimation of the one-handed controller, both Extended Kalman Filter (EKF) and Complementary Filter (CF) are used based on the readings of magnetometer and gyroscope.

2. For the horizontal position estimation of the one-handed controller, a loose-integrated navigation solution is employed with the help of GPS and accelerometer. For situations when the GPS signal is not available, other sensing techniques such as visual SLAM (simultaneous localization and mapping), visual inertial odometry, ultra-wide band positioning system, etc. can be applied to provide horizontal position (absolute or relative) estimation of the hand-held device.

3. For the height estimation of the one-handed controller, sensor fusion algorithms with height info related sensors including but not limited to GPS, barometer, inertial measurement unit (accelerometer and gyro), magnetometer, sonar, TOF based depth sensor, visual sensors such as monovision camera with visual inertial odometry, etc. can be used to handle different situations when certain subset of sensor(s) provide better (more accurate, precise, and/or stable) signals than other ones.

4. Furthermore, the sensor fusion algorithms may leverage extra information from the auto-follow task running on the drone. Such information include but is not limited to gimbal aiming angle, implied camera angle from 2D/3D pose estimation algorithms for the image patch of the person being tracked from the drone camera, etc. The sensor fusion algorithms can be applied on the portable device, on the drone, or on both devices with wireless communication modules such as Wi-Fi, Bluetooth, etc. for data transmission and synchronization.

In one embodiment, the processing system 22 may be programmed to execute a One-button Trajectory Tracking Feature function. With the estimation algorithms listed above, the drone and the one-handed controller are able to obtain relative position and velocity of the drone with respect to the controller and the user, and can achieve various control of the aircraft. State-of-the-art trajectory generation and tracking algorithms can be used. One key feature is that the aerial vehicle 12 would perform various trajectory tracking tasks when the user pushes the trajectory button. Some typical trajectory candidates are listed below as:

1. Circular trajectory: the drone moves along a circle centered at the user.

2. Spiral trajectory: the drone moves along a spiral trajectory centered at the user.

3. Direct ascension trajectory: the drone moves straight up with camera focused on the user.

In one embodiment, the processing system 22 may be programmed to execute a Tracking Lost-and-Found Policy Feature function. When the aircraft loses sight of the user, the one-handed controller 50 could provide crucial information for the aircraft 12 to regain tracking of the user. Instead of simple rotation along the yaw direction, the drone 12 would check the relative distance between the user and itself. For the cases when the user is either too far away and too close by, automatic distance adjustment is performed while the drone would rotate to the desired direction towards the user.

For the One-Click Aiming Feature: in one embodiment, the remote controller 50 includes an inertial navigation system onboard, or in other words, it is installed with a collection of sensors including inertial measurement unit (IMU), a barometer, a magnetometer and a GNSS module. In one embodiment, during the service of this remote control, state estimation techniques are performed on the internal chip to get the controller's absolute position and orientation. However, to address the alignment issue between the remote control and the drone, the drone would receive state information of the remote control through one-way communication, and adjust this issue on its own. In another embodiment, the raw sensor data with timestamps from the remote control can be all sent to the drone, and sensor fusion algorithms can be applied there to estimate the attitude, and relative position/velocity of the remote controller with respect to the drone. In either scheme mentioned above, timestamps information is crucial for achieving optimal data timing synchronization performance of the raw data of all sensors from the drone and the remote controller. Accurate raw data timestamp alignment can be achieved by periodically synchronizing system clocks between two devices via bidirectional wireless communication, or by periodically synchronizing local device system clock and GPS clock.

For the One-Hand Velocity Control Feature: 1.) as mentioned above, an alignment algorithm is applied on the drone side to recognize the aiming direction with respect to its reference frame. In particular, since the earth geodetic frame is almost the same for both the drone and the remote control, by receiving the yaw angle of the remote control with respect to this earth geodetic frame, the drone is able to identify the corresponding aiming direction; 2.) For current version of the design, the flight velocity is fixed. But it can also be related to the pressured applied to the velocity button, or angle inclination of the joystick.

For the Advanced User Localization Features: In one embodiment, both the drone and the remote would calculate their own attitudes, horizontal positions and heights onboard. But only the remote state information would be sent to the drone on a regular basis, and the drone would combine this piece of information with its front camera tracking result to get a more accurate location and facing direction of the user. Particularly, a Kalman Filter would be used during this process.

For One-Button Trajectory Tracking Feature: The remote control has individual button for each predefined flight trajectory. The controller has three user-defined buttons in total, each button will response to one trajectory. Users can determine which button corresponds to which trajectory in the controller setting page.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
  a remote controller device; and, an unmanned aerial vehicle, the remote controller device including:
  a controller device housing;
  an input device coupled to the controller device housing and being configured to receive an input from a user;
  a controller device sensor unit being located within the controller device housing and configured to sense position and/or orientation of the remote controller device; and
  an application processor programmed to:
  receive the input from the user via the input device indicating a flight command requested by the user;
  determine a current position and/or orientation of the remote controller device as a function of the sensed position and/or orientation of the remote controller device upon receiving the flight command from the user; and
  send a flight command signal to the unmanned aerial system in response to receiving the input from the user via the user input device, the unmanned aerial vehicle including:
  an aerial vehicle body;
  a lift mechanism coupled to aerial vehicle body;
  vehicle orientation sensors for sensing an orientation of the aerial vehicle body; and
  a processing system operatively coupled to the lift mechanism, the processing system programmed to execute a program including the algorithm steps of:
  receiving the flight command signal from the remote controller device;
  receiving the current position and/or orientation of the remote controller device from the remote controller device and responsively determining a desired orientation of the unmanned aerial vehicle as a function of the current position and/or orientation of the remote controller device;
  operate the lift mechanism to execute a flight operation based on the desired orientation of the unmanned aerial vehicle and the current position of the remote controller device, wherein the flight operation includes a predetermined flight trajectory and a change in the orientation of the unmanned aerial vehicle relative to the current position and/or orientation of the remote controller;
  receive an updated current position and/or an updated orientation of the remote controller device from the remote controller device and responsively determine an updated desired orientation of the unmanned aerial vehicle as a function of the current position and/or orientation of the remote controller device; and,
  operate the lift mechanism to execute an updated flight operation based on the updated desired orientation of the unmanned aerial vehicle and the updated current position of the remote controller device, wherein the flight operation includes a predetermined flight trajectory and a change in the orientation of the unmanned aerial vehicle relative to the current position and/or orientation of the remote controller.

2. The aerial system, as set forth in claim 1, wherein the processing system of the unmanned aerial vehicle, in response to receiving the flight command signal from the application processor of the remote controller device controls the lift mechanism to adjust the orientation of the aerial body as a function of the desired orientation of the current controller orientation data received from the remote controller device.

3. The aerial system, as set forth in claim 2, wherein the processing system of the unmanned aerial vehicle controls the lift mechanism to rotate the unmanned aerial device such that the aerial device is facing in a direction towards the remote controller.

4. The aerial system, as set forth in claim 3, wherein the unmanned aerial vehicle further includes an optical sensor coupled to the aerial vehicle body by an actuation mechanism coupled to the processing system, the processing system of the unmanned aerial vehicle being further configured to rotate the optical sensor about one or more axes associated with the aerial vehicle body to orientate the optical sensor towards the remote controller device in response to the processing system receiving the flight command signal.

5. The aerial system, as set forth in claim 1, wherein the user first orientates the remote controller device towards the unmanned aerial vehicle and actuates the input device, and wherein the desired orientation of the unmanned aerial vehicle is opposite the determined operation of the remote controller device.

6. The aerial system, as set forth in claim 1, wherein the flight operation includes operating the unmanned aerial vehicle in a flight path defined by the determined current orientation of the remote controller device.

7. The aerial system, as set forth in claim 6, wherein the processing system of the unmanned aerial vehicle controls the lift mechanism to fly the unmanned aerial vehicle along the flight path defined by the current orientation of the remote controller device while the input is being actuated.

8. The aerial system, as set forth in claim 6, wherein the processing system of the unmanned aerial vehicle controls the lift mechanism to fly the unmanned aerial vehicle along the flight path for a predetermined time.

9. The aerial system, as set forth in claim 1, wherein the flight operation includes a predetermined flight trajectory based on the determined current position of the remote controller device.

10. The aerial system, as set forth in claim 9, wherein the predetermined flight trajectory includes one or more of the following:
   (a) a circular trajectory in which the unmanned aerial vehicle travels along a circle circled centered on the remote controller device;
   (b) a spiral trajectory in which the unmanned aerial vehicle travels along a spiral centered on the remote controller device;
   (c) a direct ascent or descent trajectory in which the unmanned aerial vehicle travels straight up or down; and,
   (d) a user defined trajectory.

11. The aerial system, as set forth in claim 10, wherein the unmanned aerial vehicle further includes an optical sensor coupled to the aerial vehicle body by an actuation mechanism coupled to the processing system, the processing system of the unmanned aerial vehicle being further configured to rotate the optical sensor about one or more axes associated with the aerial vehicle body to orientate the optical sensor towards the remote controller device during the predetermined flight trajectory.

12. A method for operating an aerial system having a remote controller device and an unmanned aerial vehicle, the remote controller device including a controller device housing, an input device, a controller device sensor unit and an application processor, the input device coupled to the controller device housing and being configured to receive an input from a user, the controller device sensor unit being located within the controller device housing and configured to sense position and/or orientation of the remote controller device, the unmanned aerial vehicle including an aerial vehicle body, a lift mechanism coupled to aerial vehicle body, vehicle orientation sensors for sensing an orientation of the aerial vehicle body; and a processing system operatively coupled to the lift mechanism, the method including the steps of:
   receiving, by the application processor, the input from the user via the input device indicating a flight command requested by the user;
   determining, by the application processor, a current position and/or orientation of the remote controller device as a function of the sensed position and/or orientation of the remote controller device upon receiving the flight command from the user;
   sending, by the application processor, a flight command signal to the unmanned aerial system in response to receiving the input from the user via the user input device;
   receiving, by the processing system of the unmanned aerial vehicle, the flight command signal from the remote controller device;
   receiving, by the processing system of the unmanned aerial vehicle, the current position and/or orientation of the remote controller device from the remote controller device and responsively determining a desired orientation of the unmanned aerial vehicle as a function of the current position and/or orientation of the remote controller device;
   operating, by the processing system of the unmanned aerial vehicle, the lift mechanism to execute a flight operation based on the desired orientation of the unmanned aerial vehicle and including a predetermined flight trajectory, wherein the predetermined flight trajectory is executed based on the current position of the remote controller device operate the lift mechanism to execute a flight operation based on the desired orientation of the unmanned aerial vehicle and the current position of the remote controller device, wherein the flight operation includes of a predetermined flight trajectory and a change in the orientation of the unmanned aerial vehicle relative to the current position and/or orientation of the remote controller;
   receiving an updated current position and/or an updated orientation of the remote controller device from the remote controller device and responsively determining an updated desired orientation of the unmanned aerial vehicle as a function of the current position and/or orientation of the remote controller device; and,
   operating the lift mechanism to execute an updated flight operation based on the updated desired orientation of the unmanned aerial vehicle and the updated current position of the remote controller device, wherein the flight operation includes a predetermined flight trajectory and a change in the orientation of the unmanned aerial vehicle relative to the current position and/or orientation of the remote controller.

13. The method, as set forth in claim 12, including the step of adjusting, in response to receiving the flight command signal from the application processor of the remote controller device, the orientation of the aerial body as a function of the desired orientation of the current controller orientation data received from the remote controller device.

14. The method, as set forth in claim 13, including the step of rotating the unmanned aerial device such that the aerial device is facing in a direction towards the remote controller.

15. The method, as set forth in claim 14, wherein the unmanned aerial vehicle further includes an optical sensor coupled to the aerial vehicle body by an actuation mechanism coupled to the processing system, the method including the step of rotating the optical sensor about one or more axes associated with the aerial vehicle body to orientate the optical sensor towards the remote controller device in response to the processing system receiving the flight command signal.

16. The method, as set forth in claim 12, wherein the user first orientates the remote controller device towards the unmanned aerial vehicle and actuates the input device, and wherein the desired orientation of the unmanned aerial vehicle is opposite the determined operation of the remote controller device.

17. The method, as set forth in claim 12, wherein the flight operation includes operating the unmanned aerial vehicle in a flight path defined by the determined current orientation of the remote controller device.

18. The method, as set forth in claim 17, including the step of controlling the lift mechanism to fly the unmanned aerial vehicle along the flight path defined by the current orientation of the remote controller device while the input is being actuated.

19. The method, as set forth in claim 17, including the step of controlling the lift mechanism to fly the unmanned aerial vehicle along the flight path for a predetermined time.

20. The method, as set forth in claim 12, wherein the flight operation includes a predetermined flight trajectory based on the determined current position of the remote controller device.

21. The method, as set forth in claim 20, wherein the predetermined flight trajectory includes one or more of the following:
   (e) a circular trajectory in which the unmanned aerial vehicle travels along a circle circled centered on the remote controller device;
   (f) a spiral trajectory in which the unmanned aerial vehicle travels along a spiral centered on the remote controller device;
   (g) a direct ascent or descent trajectory in which the unmanned aerial vehicle travels straight up or down; and,
   (h) a user defined trajectory.

22. The method, as set forth in claim 21, wherein the unmanned aerial vehicle further includes an optical sensor coupled to the aerial vehicle body by an actuation mechanism coupled to the processing system, including the step of rotating the optical sensor about one or more axes associated with the aerial vehicle body to orientate the optical sensor towards the remote controller device during the predetermined flight trajectory.

* * * * *